United States Patent
Seibold (10) Patent No.: US 11,440,450 B2
(45) Date of Patent: Sep. 13, 2022

(54) THIGH SUPPORT AND SEAT

(71) Applicant: Adient Engineering and IP GmbH, Burscheid (DE)

(72) Inventor: Kurt Seibold, Farmington Hills, MI (US)

(73) Assignee: Adient US LLC, Plymouth, MI (US)

( * ) Notice: Subject to any disclaimer, the term of this patent is extended or adjusted under 35 U.S.C. 154(b) by 0 days.

(21) Appl. No.: 17/018,217

(22) Filed: Sep. 11, 2020

(65) Prior Publication Data

US 2021/0070203 A1 Mar. 11, 2021

Related U.S. Application Data (60) Provisional application No. 62/898,850, filed on Sep. 11, 2019.

(51) Int. Cl.
*B60N 2/62* (2006.01)
*B60N 2/02* (2006.01)
*A47C 1/023* (2006.01)

(52) U.S. Cl.
CPC ............. *B60N 2/62* (2013.01); *B60N 2/0284* (2013.01); *A47C 1/023* (2013.01)

(58) Field of Classification Search
CPC .......... B60N 2/62; B60N 2/0284; A47C 1/023
See application file for complete search history.

(56) References Cited

U.S. PATENT DOCUMENTS

| | | | |
|---|---|---|---|
| 2,636,550 A | 10/1951 | Poyer | |
| 7,458,637 B2 * | 12/2008 | Norman | A47C 7/46 297/284.4 |
| 8,162,397 B2 * | 4/2012 | Booth | B60N 2/62 297/284.11 |
| 9,016,783 B2 | 4/2015 | Line et al. | |
| 9,016,784 B2 | 4/2015 | Line et al. | |
| 9,756,408 B2 * | 9/2017 | Ferretti | B60N 2/879 |
| 9,902,293 B2 * | 2/2018 | Line | B60N 2/0284 |
| 10,611,277 B2 | 4/2020 | Engelke et al. | |
| 10,640,011 B2 * | 5/2020 | Anzenberger | B60N 2/62 |
| 2006/0061167 A1 * | 3/2006 | Adragna | B60N 2/62 297/284.1 |

FOREIGN PATENT DOCUMENTS

WO 2008116180 A2 9/2008

* cited by examiner

*Primary Examiner* — Syed A Islam
(74) *Attorney, Agent, or Firm* — Marshall & Melhorn, LLC (57) ABSTRACT

A seat comprises a backrest, a seat support coupled to the backrest; and a thigh support coupled to the seat support. The thigh support includes a thigh support structure having a thigh extension, wherein the thigh extension is movably adjustable between a retracted position and a fully extended position. The thigh extension may include at least one elastically deformable element.

16 Claims, 9 Drawing Sheets

THIGH SUPPORT AND SEAT

CROSS-REFERENCE TO RELATED APPLICATION

The present application claims the benefit to U.S. Provisional Patent Application Ser. No. 62/898,850, filed Sep. 11, 2019, which is incorporated herein by reference in its entirety.

FIELD

The present disclosure relates generally to a seat, and more particularly to an adjustable thigh support for a seat.

BACKGROUND OF THE DISCLOSURE

Seats, in particular vehicle seats are well known from the state of the art. Common vehicle seats comprise a backrest and a seat support with a cushion. In order to accommodate occupants of varying heights, an upholstered thigh support is connected to the vehicle seat. Thigh supports are generally understood as meaning a movable attachment to a front region of the cushion or part of the cushion of the seat support. Prior art thigh supports are provided with a resistance and positionable with respect to the seat support. In some vehicle seats, during a braking operation, the occupant exerts a downwardly directed force on the thigh support with his or her thighs and can thus push the thigh support downward. The resistance which the thigh support has in relation to the downward movement of the thighs may be balanced or set or determined in such a manner that the dead weight of the thighs or of the legs of the occupant is provided with a comfortable support, but, on the other hand, during a conscious downward movement of the thighs, for example during the braking operation, the movement resistance of the thigh support does not cause any delay in a brake path.

The movement resistance in relation to the downwardly directed force, in particular a downward movement of the thighs or of the legs, is typically determined by the distance of a front wall of the thigh support from a seat surface. A large distance between thigh support and seat surface generally produces a large lever arm and therefore a small movement resistance of the thigh support, although occupants who set a greater distance generally also require a large movement resistance in relation to downward movements so that the legs can comfortably rest on the thigh support during travel. Conversely, a small distance between the front wall of the thigh support and the seat surface generally produces a small lever arm and therefore a large movement resistance of the thigh support, although occupants who set a small distance generally also only require a small movement resistance in relation to downward movements.

Drawbacks of such prior art thigh supports require complex guide and adjustment devices. Such adjustment devices may include a rack apparatus comprising a pair of racks meshing with a spur gearwheel. Additionally, the adjustment devices may further include an electrical device for the operability and activatability of the adjustment devices.

It would therefore be advantageous to develop a seat having a thigh support to enhance comfortability and support to a user, while minimizing cost and complexity thereof.

SUMMARY OF THE DISCLOSURE

In concordance and agreement with the present disclosure, a seat having a thigh support to enhance comfortability and support to a user, while minimizing cost and complexity thereof, has surprisingly been discovered.

In one embodiment of the presently disclosed subject matter, a thigh support for a seat comprises: a thigh support structure; and a thigh extension formed on the thigh support structure, wherein the thigh extension is configured as an elastically deformable element.

According to certain aspects of the embodiment, the elastically deformable element is at least one leaf spring.

According to certain aspects of the embodiment, the elastically deformable element is made of spring steel.

According to certain aspects of the embodiment, the least one leaf spring has at least two ends including a first end and a second end, wherein the first end is a free end and the second end is connectable to at least one seat component.

According to certain aspects of the embodiment, the elastically deformable element includes a first leaf spring and a second leaf spring.

According to certain aspects of the embodiment, the first leaf spring has a free first end and a second end and the second leaf spring is arranged on a lower surface side of the first leaf spring.

According to certain aspects of the embodiment, the thigh support structure includes a junction having at least two members each forming a flank side and limiting a receiving space of the junction for coupling of the thigh support structure to at least one seat component.

According to certain aspects of the embodiment, further comprises at least one retaining element for retaining tension on the elastically deformable element.

In another embodiment of the presently disclosed subject matter, a seat, comprises: a backrest; a seat support coupled to the backrest; and a thigh support coupled to the seat support, the thigh support including a thigh support structure having a thigh extension, wherein the thigh extension is movably adjustable between a retracted position and a fully extended position.

According to certain aspects of the embodiment, the backrest is pivotably coupled to the seat support.

According to certain aspects of the embodiment, the seat support includes an anti-submarining structure and wherein the thigh support is connected to or part of the anti-submarining structure.

According to certain aspects of the embodiment, further comprises a seat base for supporting the seat support.

According to certain aspects of the embodiment, the thigh support is at least one of longitudinally and pivotably adjusted relative to at least one of the seat support and the seat base.

According to certain aspects of the embodiment, the thigh extension includes at least one elastically deformable element.

According to certain aspects of the embodiment, the at least one elastically deformable element is movable at a bend point formed therein According to certain aspects of the embodiment, the at least one elastically deformable element is at least one leaf spring.

According to certain aspects of the embodiment, the least one leaf spring has at least two ends including a first end and a second end, wherein the first end is a free end and the second end is connectable to the seat support.

According to certain aspects of the embodiment, the at least one elastically deformable element includes a first leaf spring and a second leaf spring.

According to certain aspects of the embodiment, the first leaf spring has a free first end and a second end and the second leaf spring is arranged on a lower surface side of the first leaf spring.

According to certain aspects of the embodiment, further comprises at least one retaining element for retaining tension on the at least one elastically deformable element.

BRIEF DESCRIPTION OF THE DRAWINGS

The present disclosure will become more fully understood from the detailed description given herein below and the accompanying drawings which are given by way of illustration only, and thus, are not limitative of the present disclosure, wherein.

DETAILED DESCRIPTION OF PREFERRED EMBODIMENTS

For purposes of description herein, the terms "upper," "lower," "right," "left," "rear," "front," "vertical," "horizontal," and derivatives thereof shall relate to embodiments of the presently described subject matter as oriented in FIGS. 1-10. However, it is to be understood that the embodiments may assume various alternative, orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

FIGS. 1-10 show a seat 1 according to an embodiment of the presently disclosed subject matter. The seat 1 may be employed in various applications such as in a vehicle, for example. The seat 1 generally includes a backrest 2, which is shown in FIG. 1B with upholstery U but without trim cover TC, and a seat support 3. The seat support 3, shown in FIGS. 5 and 6, may also be provided with upholstery U and a trim cover TC. It should be appreciated that the upholstery U and the trim cover TC may be any of a variety of materials, including traditional fabrics, as well as leathers, vinyls, etc. In certain embodiments, the backrest 2 is pivotally coupled with the seat support 3, such that the backrest 2 may be moved between upright and inclined positions. The seat support 3 may be configured to allow at least one of the backrest 2 and the seat 1, in its entirety, to be selectively adjusted and positioned, (e.g. manually or motor driven).

The backrest 2 may be configured to support a headrest (not depicted) thereon. The headrest may be operably coupled with the backrest 2 and also selectively positionable relative to the backrest 2 to support a head and a neck of an occupant O (e.g. a driver or a passenger of the vehicle). The headrest may also be configured to restrain the head of the occupant O during an impact.

As illustrated, the seat 1 may further include a thigh support 4, which structure will be described in further detail hereinafter. The thigh support 4 is generally configured to apply selective support to the underside of the thighs or the legs of the occupant O. The thigh support 4 may also be provided with an upholstery U and a trim cover TC (shown in FIGS. 7-9). Although the thigh support 4 shown in a unitary structure, it is understood that each leg of the occupant O may be independently supported by a separate and distinct thigh support 4, if desired. The thigh support 4 is variably moveable between a retracted position P1 with respect to the seat support 3, shown in FIG. 1A dashed lines, 5, and 8, to a fully extended position P2 with respect to the seat support 3, shown in FIG. 1A solid lines, 1B, 3, 6-7, and 9-10, and any intermediate tilted position therebetween, shown in FIGS. 2 and 4, to modify an effective seating area of the seat 1 and accommodate the size, shape, posture, and sitting positions of the occupant O. The thigh support 4 may be translationally and pivotably coupled to the front of the seat support 3. Hence, the thigh support 4 may be longitudinally and pivotably adjusted relative to the seat support 3 and the seat base 5 in order to accommodate occupants O of varying heights. In particular, the thigh support 4 may increase a comfort for the occupant O over a longer period of time, due to an improved support for thighs T of the occupant O (see FIGS. 3 and 4).

Referring now to FIGS. 1B-4, the seat 1 includes a seat base 5 for supporting the seat support 3 according to one embodiment of the presently disclosed subject matter. FIGS. 5-9 show the seat base 5 according to another embodiment of the presently disclosed subject matter. It is understood that each of the backrest 2, the seat support 3, and the seat base 5 may be formed from a variety of materials such as a metal material (e.g. steel, aluminum, and the like, etc.), a non-metal material (e.g. a composite, a plastic, and the like, etc.), or any combination thereof, if desired. The seat 1 may further include other additional components, such as, foam padding, and the like, to provide support, comfort, protection and aesthetic appearance to the seat 1. In certain embodiments, the seat 1 further includes a recliner mechanism (not depicted) for pivotably adjusting the backrest 2 relative to at least one of the seat support 3 and the seat base 5.

Figure 1A:
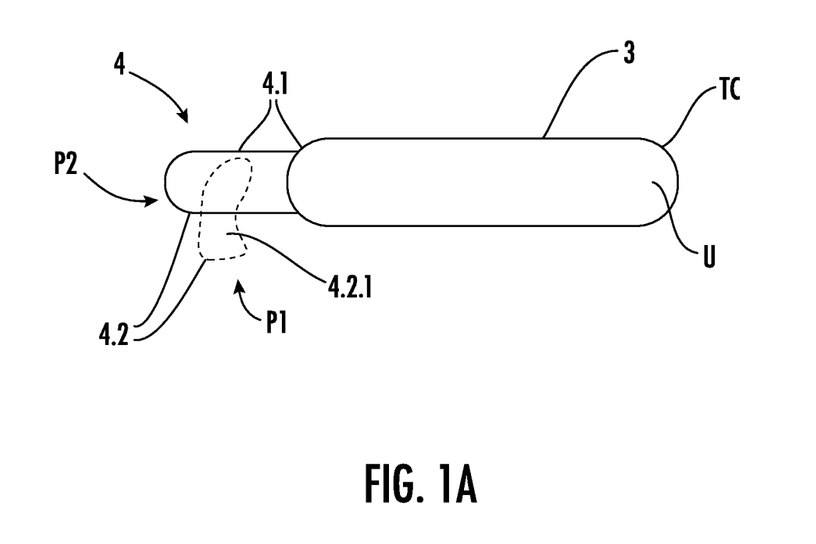
FIG. 1A is a schematic right side elevational view of a portion of a seat with a thigh support according to an embodiment of the presently disclosed subject matter, showing a fully extended position of the thigh support in solid lines and a retracted position of the thigh support in dashed lines.
Figure 1B:
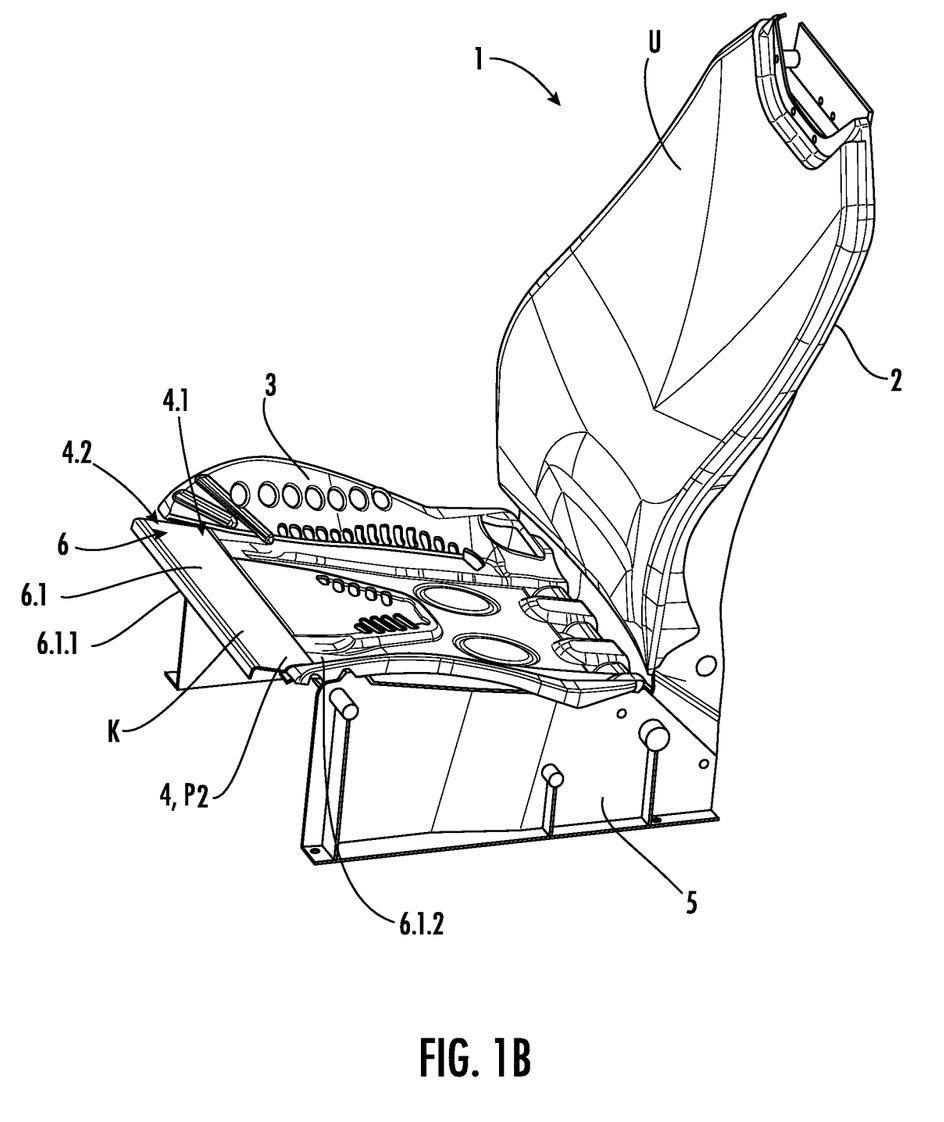
FIG. 1B is a right side perspective view of a seat with the thigh support shown in the fully extended position.
Figure 2:
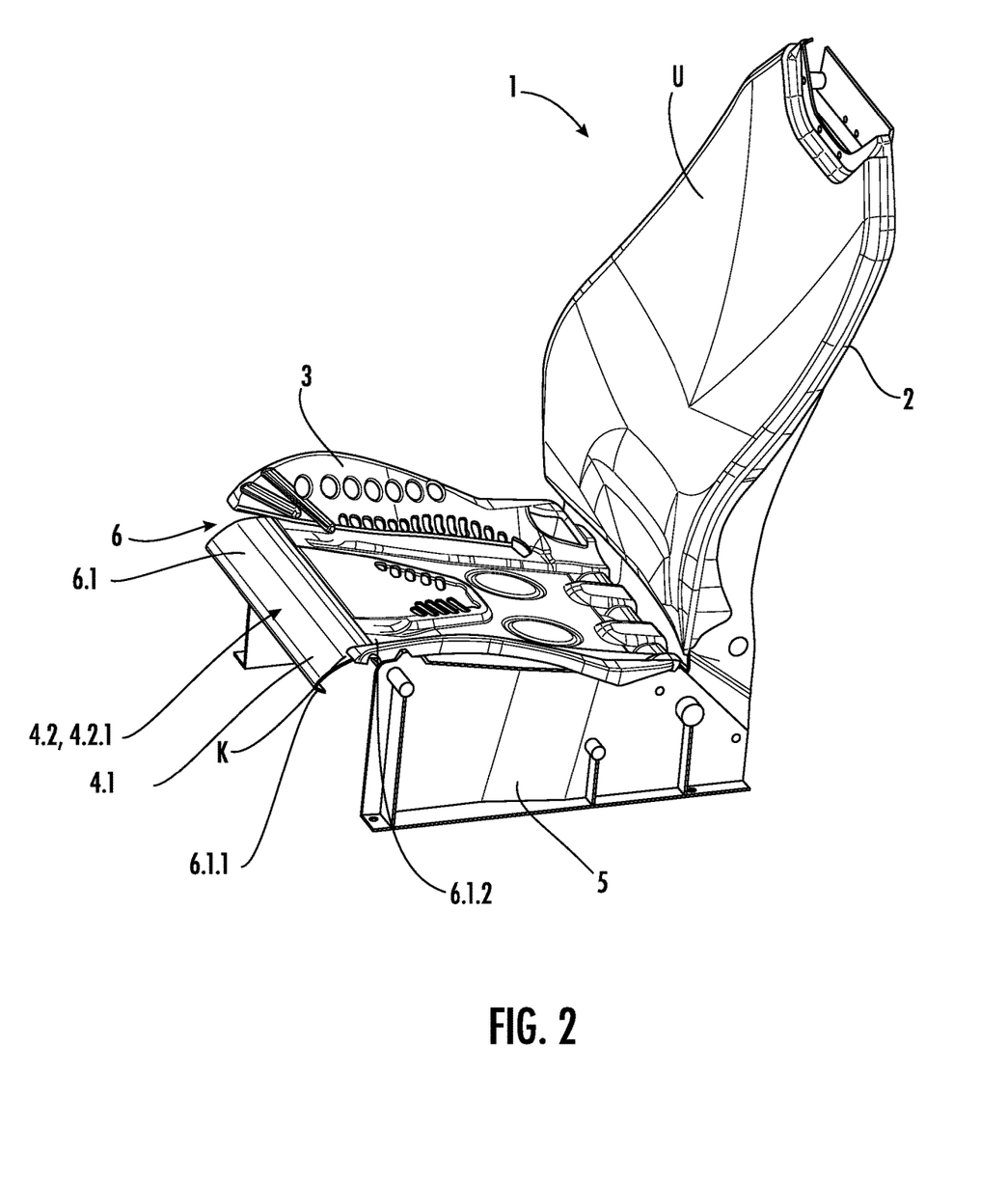
FIG. 2 is a right side perspective view of the seat of FIGS. 1A and 1B with the thigh support in an extended tilted position.
Figure 3:
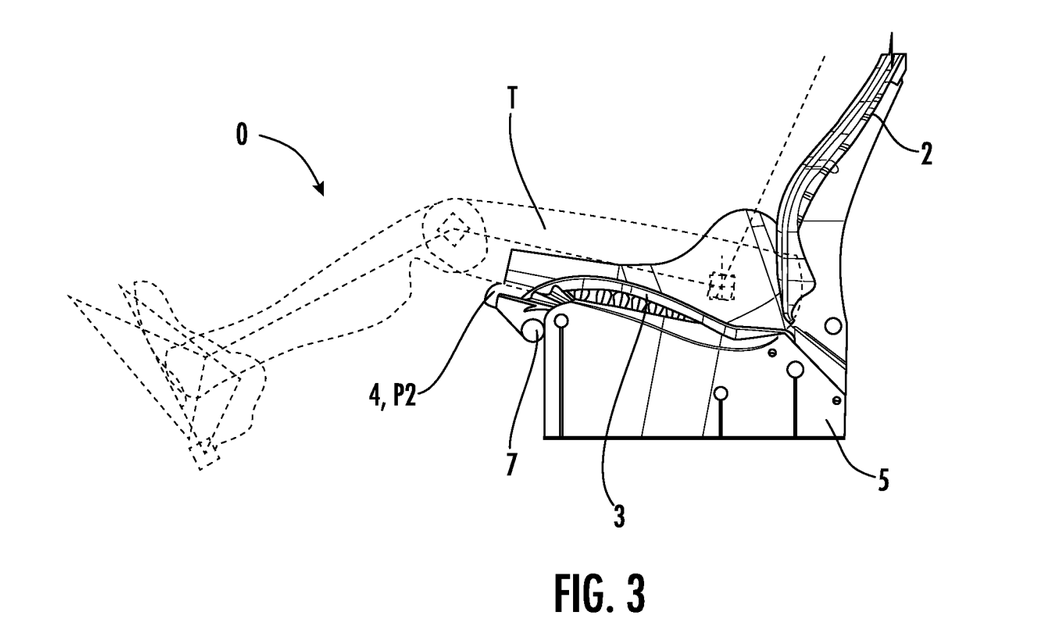
FIG. 3 is a right side elevational view of the seat structure of FIGS. 1A, 1B, and 2 with the thigh support in the fully extended position, showing a portion of an occupant partially in dashed lines.
Figure 4:
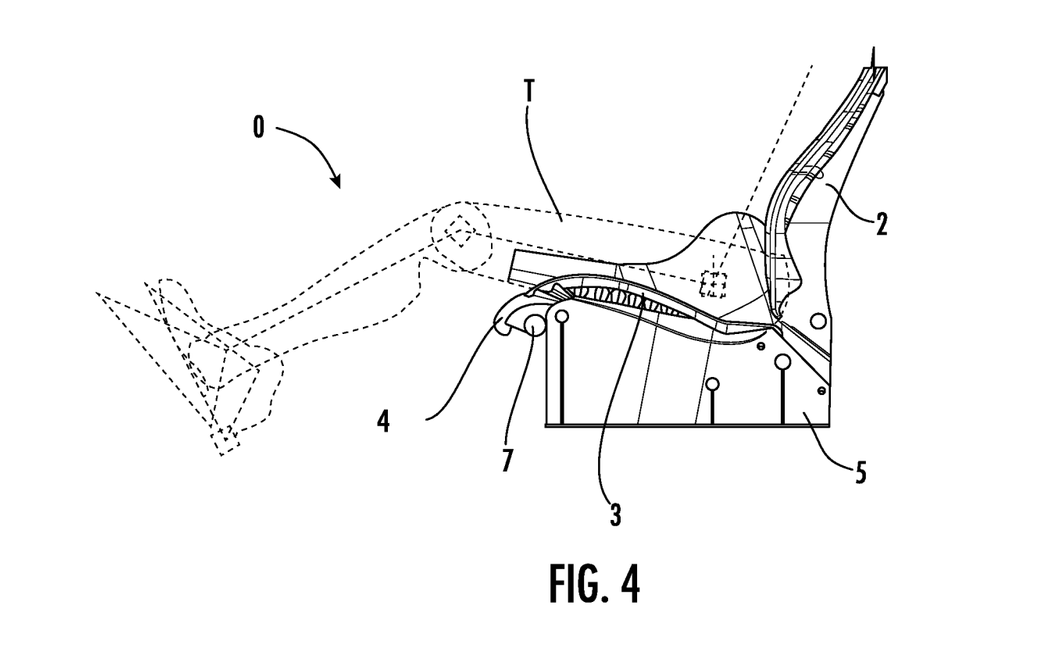
FIG. 4 is a right side elevational view of the seat structure of FIGS. 1A, 1B, and 2 with the thigh support in the extended tilted position, showing a portion of an occupant partially in dashed lines.
Figure 5:
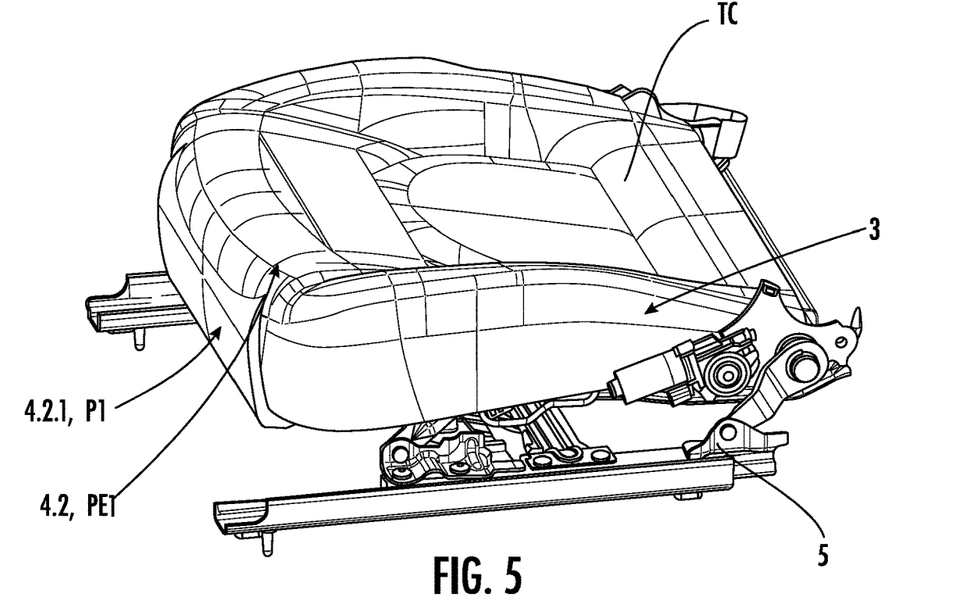
FIG. 5 a right side perspective view of a seat base of the seat with the thigh support in the retracted position.
Figure 6:
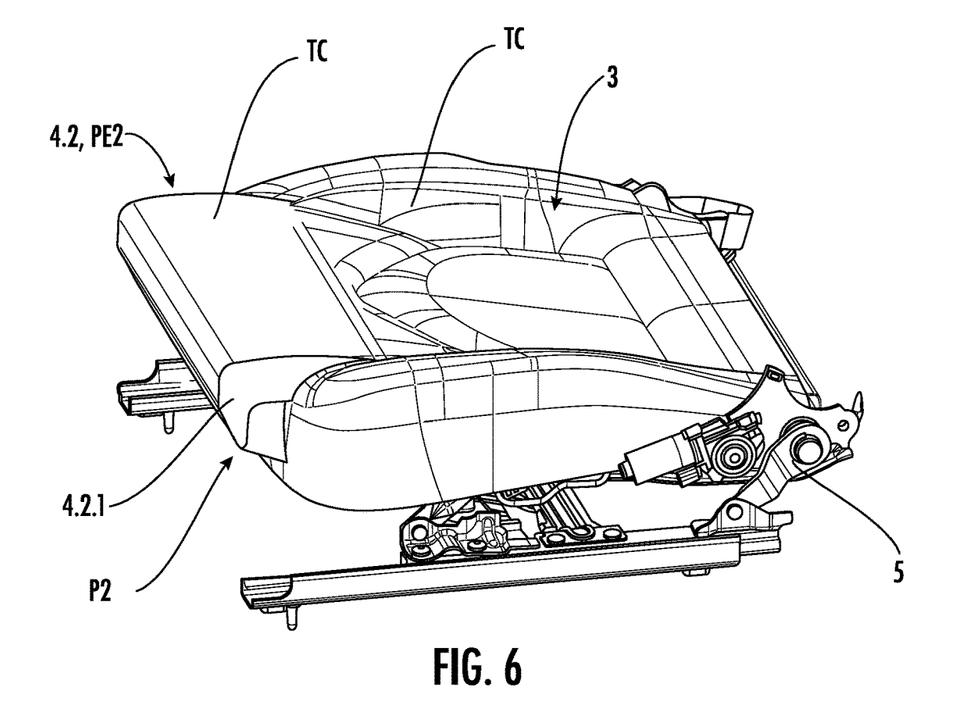
FIG. 6 is a right side perspective view of the seat base of the seat with the thigh support in the fully extended position.

As more clearly shown in FIG. 1A, the thigh support 4 comprises a thigh support structure 4.1 having a thigh extension 4.2 for the seat support 3. The thigh support 4 may be arranged at a front of the seat support 3. In one embodiment, the seat support 3 may comprise or be part of an anti-submarining structure of the seat 1. Therefore, the thigh support structure 4.1 may be then connected to or be part of the anti-submarining structure.

In certain embodiments, the thigh extension 4.2 may be configured as at least one elastically deformable element 4.2.1 (e.g. a panel forming the thigh extension 4.2). The thigh extension 4.2 may be part, (e.g. an integrated front part), of the thigh support 4. The thigh extension 4.2 may be deformable and variably adjustable and selectively positionable from a retracted position PE1 with respect to the seat support 3 to a fully extended position PE2 with respect to the seat support 3. For moving the thigh extension 4.2 from the retracted position PE1 into the fully extended position PE2 with respect to the seat support 3, and thereby the thigh support 4 from the retracted position P1 into the fully extended position P2 with respect to the seat support 3, a shift mechanism 4.3 (see FIG. 10) may be provided.

Figure 10:
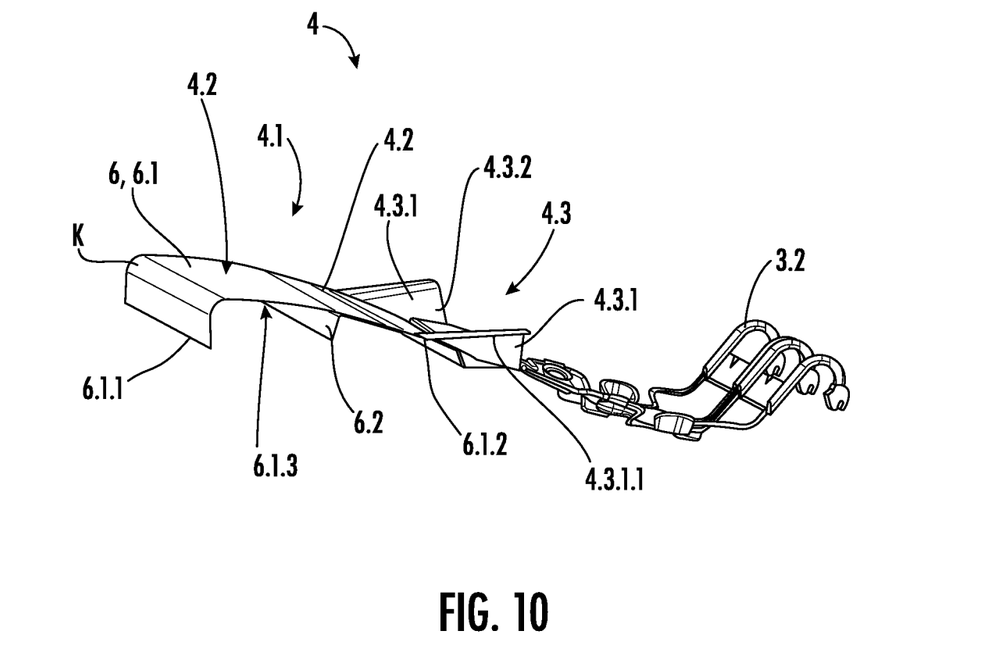
FIG. 10 is a right side perspective view of a portion of the support structure of the seat base of the seat with the thigh support in the fully extended position.

In particular, as shown in FIG. 10, the elastically deformable element 4.2.1 may be a spring element 6 (e.g. a panel- or plate-shaped spring element). The spring element 6 enables tilting or unfurling of the thigh extension 4.2 relative to the seat support 3 and the seat base 5 and/or to the thigh support structure 4.1 under pressure applied by thighs T of the occupant O (see FIG. 4). Hence, the spring element 6 forms the thigh support extension 4.2. The disclosed thigh extension 4.2 enables an enlarged thigh support 4 as compared to prior art thigh supports without any joint and is infinitely adjustable and positionable due to the elastically deformable spring element 6 forming the thigh extension 4.2. An adjustment of the thigh support 4 by the occupant O may be only limited by a distance between the thigh support 4 and a support structure (i.e. the seat base 5 or a vehicle floor).

As shown in FIG. 10, the spring element 6 comprises at least one leaf spring 6.1. Various materials may be used to form the at least one leaf spring 6.1 such as a spring steel, for example. This allows a deformable thigh extension 4.2 that is capable of tilting and shifting with respect to the thigh support 4 and/or a seat support 3 in order to lengthen the thigh support structure 4.1 and provide an adjustable thigh support structure 4.1 for the occupant O.

As illustrated, the leaf spring 6.1 may be formed sheet-like or panel-like or plate-like, if desired. In certain embodiments, the leaf spring 6.1 may be biased upward toward the occupant O in a free state and includes a downwardly extending free forward first end 6.1.1. In particular, the leaf spring 6.1 has two ends 6.1.1, 6.1.2 including the forward first end 6.1.1 and a backward second end 6.1.2. The backward second end 6.1.2 may be connectable to the seat support 3. In another embodiment, the spring element 6 may be configured as a multi-stable leaf spring 6.1. More particularly, a bi-stable leaf spring 6.1, which is movable along bend points or weak folds K in different positions, e.g. into the retracted position PE1, the fully extended position PE2, or other intermediate tilted positions of the thigh extension 4.2. Hence, the furling or tilting of the thigh extension 4.2 would not perform linearly. A front part of the seat support 3 may include a stop 3.1 for limiting the furling or tilting deformation or movement of the leaf spring 6.1 between the different positions P1 and P2.

Advantageously, the elastically deformable thigh support 4 has an inherent ability to deform under load. As such, the thigh support 4 of the presently disclosed subject matter ensures proper support and pressure control at an end portion of the thigh T, which is a most sensitive area of the occupant O for induced pressure. The thigh support 4 may be tilted or furled only under pressure applied by the thigh T of the occupant O. The upholstery U and the trim cover TC follow the tilting movement of the leaf spring 6.1 without requiring unique countermeasures.

Figure 7:
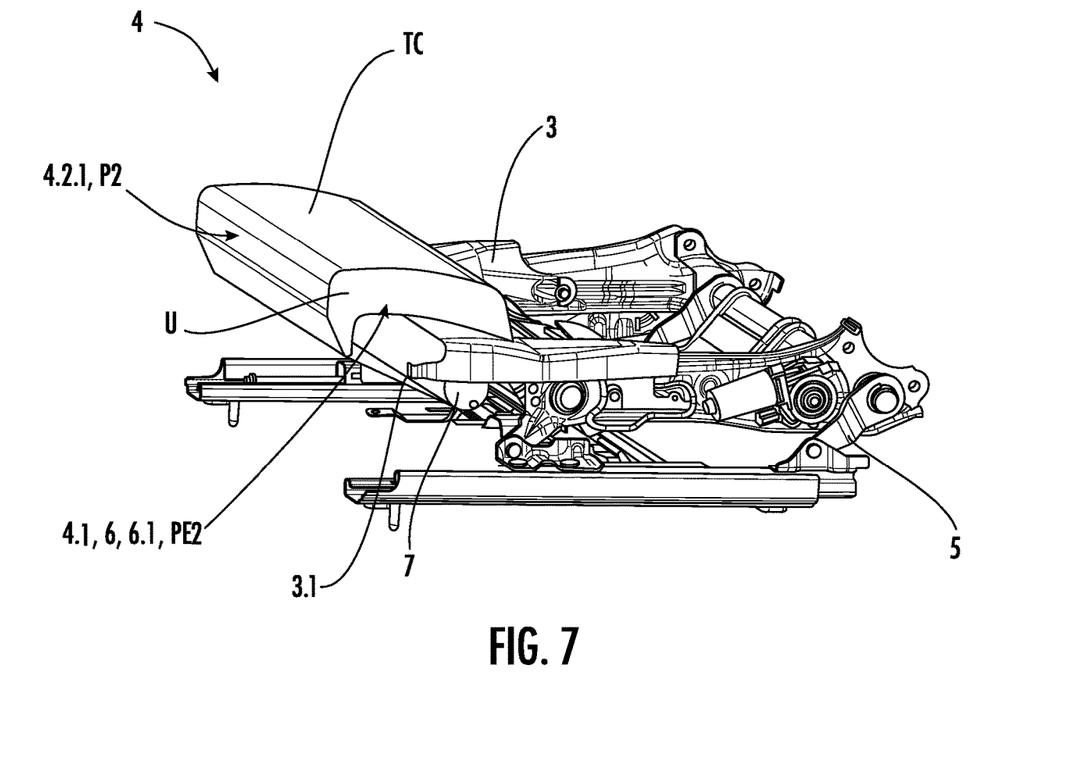
FIG. 7 is a right side perspective view of a support structure of the seat base of the seat with the thigh support in the fully extended position.
Figure 8:
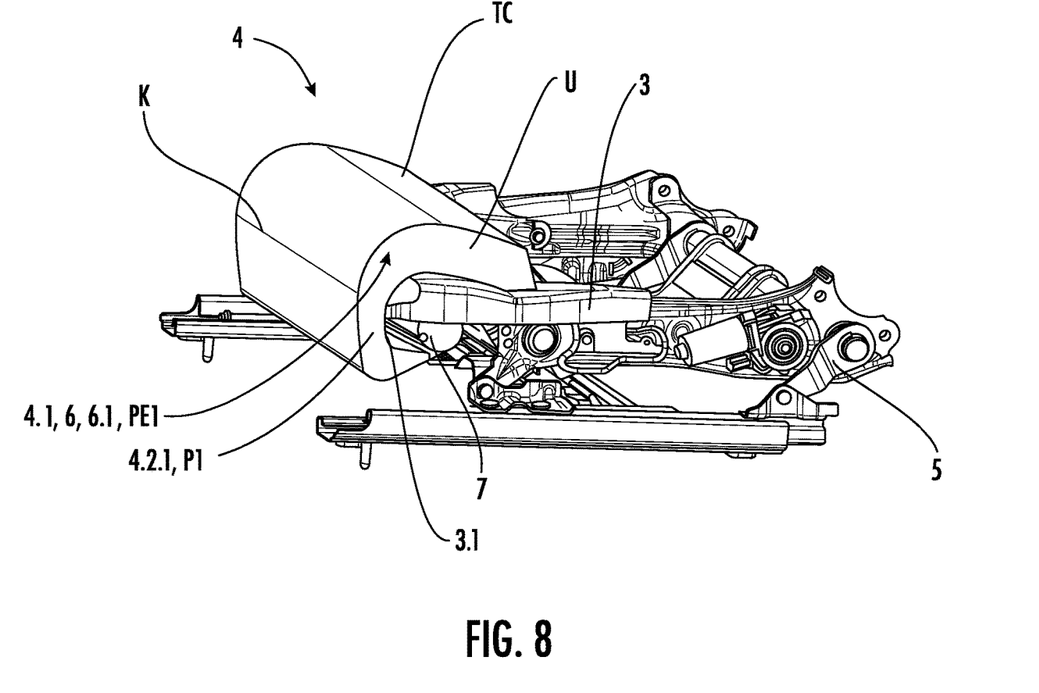
FIG. 8 is a right side perspective view of the support structure of the seat base of the seat with the thigh support in the retracted position.
Figure 9:
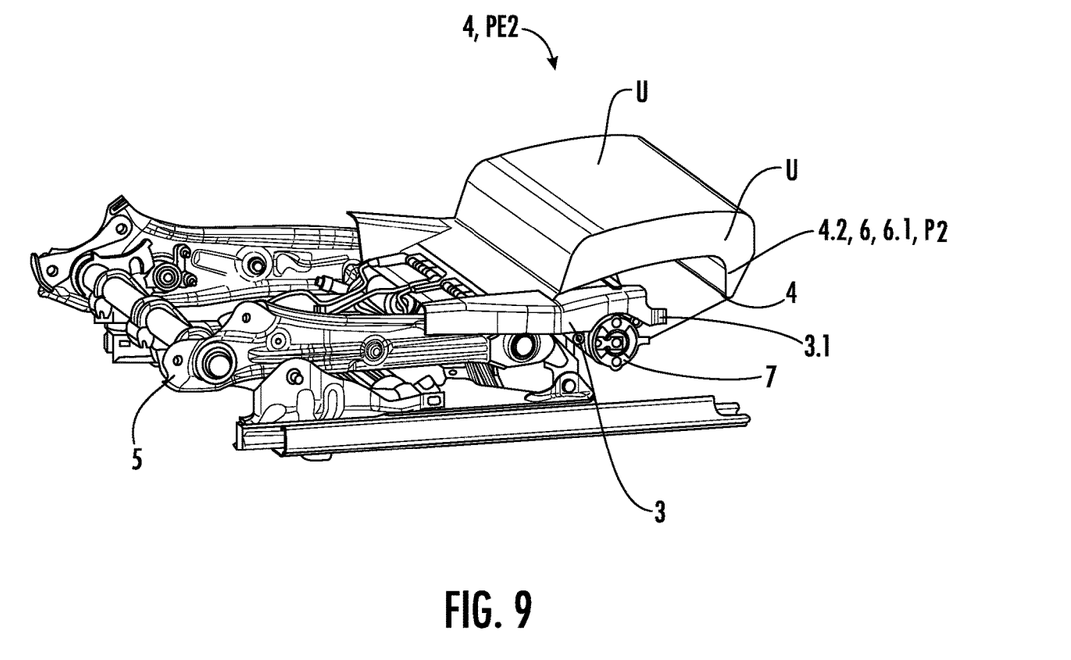
FIG. 9 is a left side perspective view of the support structure of the seat base of the seat with the thigh support in the fully extended position and a retaining element.

As shown in the present embodiments, the thigh support 4 further comprises a retaining element 7, shown more clearly in FIGS. 7-9, for retaining tension on the spring element 6, i. e. the leaf spring 6.1. The retaining element 7 may be any restrictive motion element that creates tension on the spring element 6. For example, the retain element 7 may be a clutch element operable by any suitable method such as a handle, a rotatory drive, a linear pull, or a rack and a pinion, for example.

For retracting the thigh support 4 from the fully extended position P2 into the retracted position P1 and thereby retracting the thigh extension 4.2 from the fully extended position PE2 into the retracted position PE1, the occupant O may pull on a top surface of the thigh support 4 or via a tension device, such as the retaining element 7. The retaining element 7 may include a clutch element operably by any suitable method such as a handle, a rotary drive, a linear pull, or a rack and pinion, for example. Alternatively, the retaining element 7 may include any other suitable manual or power drive element, if desired.

Referring now to FIG. 10, which shows the thigh support 4 including the thigh support structure 4.1 having the thigh extension 4.2 coupled to a seat support suspension structure 3.2. In the embodiment shown, the spring element 6 of the thigh extension 4.2 comprises the leaf springs 6.1, 6.2 in order to meet high degrees of deflection and load requirements. In particular, the spring element 6 comprises the leaf spring 6.1 as described before having the free forward first end 6.1.1 and the backward second end 6.1.2 and another leaf spring 6.2 that is arranged on a lower surface 6.1.3 of the leaf spring 6.1.

Additionally, the thigh support 4 may include a shift mechanism 4.3 having a junction with at least two upwardly extending members 4.3.1. The members 4.3.1 each form a flank side and limit a receiving space 4.3.2 of the junction for coupling of the thigh support 4 to the seat support 3. The members 4.3.1. also form a guide for sliding the thigh support 4 with respect to the seat support 3 and the seat base 5 in order to move the thigh support extension 4.2 from the retracted position PE1 into the fully extended position PE2 and otherwise. The members 4.3.1 include respective outwardly extending flanges 4.3.1.1 for strengthening the members 4.3.1 and thus the coupling of the thigh support 4 to the seat support 3.

It will be understood by one having ordinary skill in the art that construction of the presently disclosed subject matter and other components is not limited to any specific material. Other exemplary embodiments of the presently disclosed subject matter may be formed from a wide variety of materials, unless described otherwise herein.

For purposes of this disclosure, the term "coupled" (in all of its forms, couple, coupling, coupled, etc.) generally means the joining of two components (electrical or mechanical)) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the presently disclosed subject matter as shown in the exemplary embodiments is illustrative only. Although only a few embodiments of the present disclosed subject matter have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited.

For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating positions, and arrangement of the desired and other exemplary embodiments without departing from the spirit of the presently disclosed subject matter.

It will be understood that any described processes or steps within described processes may be combined with other disclosed processes or steps to form structures within the scope of the presently disclosed subject matter. The exemplary structures and processes disclosed herein are for illustrative purposes and are not to be construed as limiting.

It is also to be understood that variations and modifications can be made on the aforementioned structures and methods without departing from the concepts of the presently disclosed subject matter, and further it is to be understood that such concepts are intended to be covered by the following claims unless these claims by their language expressly state otherwise.

What is claimed is:

1. A thigh support for a seat comprising:
a thigh support structure; and
a thigh extension formed on the thigh support structure, wherein the thigh extension is configured as at least one elastically deformable element, wherein the thigh extension is movably adjustable between a retracted position and a fully extended position, wherein the at least one elastically deformable element includes a first leaf spring and a second leaf spring, and wherein the first leaf spring has a first end and a second end, and the second leaf spring abuts a lower surface side of the first leaf spring.

2. The thigh support according to claim 1, wherein the at least one elastically deformable element is made of spring steel.

3. The thigh support according to claim 1, wherein the first end of the first leaf spring is a free end and the second end of the first leaf spring is connectable to at least one seat component.

4. The thigh support according to claim 1, wherein the thigh support structure includes a junction having at least two members each forming a flank side and limiting a receiving space of the junction for coupling of the thigh support structure to at least one seat component.

5. The thigh support according to claim 1, further comprising at least one retaining element for retaining tension on the at least one elastically deformable element, wherein the at least one retaining element is configured to move the at least one elastically deformable element from the fully extended position to at least one of the retracted position and a position between the fully extended position and the retracted position.

6. The thigh support according to claim 1, wherein the at least one elastically deformable element includes at least one preformed bend point parallel to a front of the thigh extension, wherein the at least one elastically deformable element is configured to deform at the at least one preformed bend point during the movement of the thigh extension between the fully extended position and the retracted position.

7. The thigh support according to claim 1, wherein the first leaf spring is biased upward toward the fully extended position in a free state.

8. The thigh support according to claim 1, wherein the second leaf spring is biased upward toward the fully extended position in a free state.

9. A seat, comprising:
a backrest;
a seat support coupled to the backrest; and
a thigh support coupled to the seat support, the thigh support including a thigh support structure having a thigh extension, wherein the thigh extension is movably adjustable between a retracted position and a fully extended position, wherein the thigh extension is configured as at least one elastically deformable element, wherein the at least one elastically deformable element includes a first leaf spring and a second leaf spring, and wherein the first leaf spring has a first end and a second end, and the second leaf spring abuts a lower surface side of the first leaf spring.

10. The seat according to claim 9, wherein the backrest is pivotably coupled to the seat support.

11. The seat according to claim 9, further comprising a seat base for supporting the seat support.

12. The seat according to claim 11, wherein the thigh support is at least one of longitudinally and pivotably adjusted relative to at least one of the seat support and the seat base.

13. The seat according to claim 9, wherein the at least one elastically deformable element has at least one preformed bend point parallel to a front of the thigh extension, and wherein the at least one elastically deformable element is configured to deform at the at least one preformed bend point during the movement of the thigh extension between the retracted position and the fully extended position.

14. The seat according to claim 9, wherein the first end of the first leaf spring is a free end and the second end of the first leaf spring is connectable to the seat support.

15. The seat according to claim 9, further comprising at least one retaining element for retaining tension on the at least one elastically deformable element, wherein the at least one retaining element is configured to move the elastically deformable element from the fully extended position to at least one of the retracted position and a position between the fully extended position and the retracted position.

16. A thigh support for a seat comprising:
a thigh support structure; and
a thigh extension formed on the thigh support structure, wherein the thigh extension is movably adjustable between a retracted position and a fully extended position, wherein the thigh extension is configured as at least one elastically deformable element, wherein the at least one elastically deformable element includes a first leaf spring and a second leaf spring, wherein a first end of the first leaf spring is a free end and a second end of the first leaf spring is connectable to a seat support, and wherein the first leaf spring is biased upward toward the fully extended position in a free state.

* * * * *